March 31, 1970     KOSUKE HARADA     3,504,270
IGNITION CONTROL OF CONTROLLED RECTIFYING DEVICES
Filed Aug. 5, 1964     2 Sheets-Sheet 1

INVENTOR
Kosuke Harada
BY Paul M. Craig, Jr.
ATTORNEY

March 31, 1970  KOSUKE HARADA  3,504,270
IGNITION CONTROL OF CONTROLLED RECTIFYING DEVICES
Filed Aug. 5, 1964  2 Sheets-Sheet 2

INVENTOR
Kosuke Harada
BY Paul M. Craig Jr.
ATTORNEY

United States Patent Office 3,504,270
Patented Mar. 31, 1970

3,504,270
IGNITION CONTROL OF CONTROLLED
RECTIFYING DEVICES
Kosuke Harada, 1 Surugadani, Fukuoka-shi, Japan
Filed Aug. 5, 1964, Ser. No. 387,704
Int. Cl. G05f 1/40
U.S. Cl. 323—22          1 Claim

ABSTRACT OF THE DISCLOSURE

An ignition controlling system for a voltage controlled rectifier connected to a source of A.C. voltage wherein an ignition control device, which may be a magnetic amplifier, is connected to the control electrode of the rectifier for controlling the firing thereof in response to an applied control signal and an A.C. supply voltage derived from the source of A.C. voltage and reduced in frequency to a submultiple of the frequency of the source.

---

This invention relates to ignition control of controlled rectifying devices.

Ignition devices of controlled rectifiers are desired to have wide ranges of control and are stable in operation. This is especially required when regenerative braking is to be effected in an electric motor drive, for examlpe, by operating the rectifier as an invertor also.

An object of the present invention is to accomplish a wide-range control of the ignition of the rectifier by utilizing an alternating current having a frequency of $n/m$ times the frequency of the supply source for the controlled rectifier, as the source for the ignition controlling device, where $n<m$, and $m$ and $n$ are integers.

Another object of the present invention is to provide an ignition device which is strong in construction and stable in operation, by utilization of magnetic means in combination therewith.

There are other objects and particularities of the present invention, which will be made obvious in the following detailed description of the invention, in which reference is made to the accompanying drawings, in which.

Figure 1:
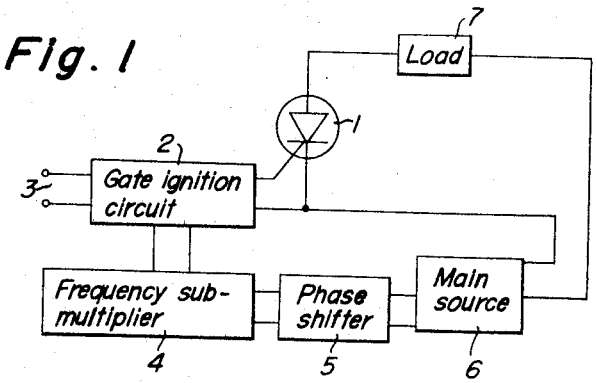
FIG. 1 is a block diagram showing an embodiment of the present invention.

Referring to FIG. 1, the apparatus embodying the present invention comprises a rectifier 1 having a control electrode or gate, which may be a silicon controlled rectifier, and is hereinafter designated as SCR; a gate ignition circuit 2 formed by saturable reactor, magnetic amplifier, magnetic modulator, or other magnetic means, for controlling the ignition phase of the SCR in response to signals applied to input terminals 3; and a frequency divider or submultiplier 4 for generating an A.C. voltage of frequency $n/m$ times the frequency of a main electrical source 6, where $n<m$, and $n$ and $m$ are integers. The output of frequency divider 4 is the supply source for gate ignition circuit 2.

The apparatus further comprises a phase shifter 5 for adjusting the phase of the input voltage to the frequency divider 4, in order that the ignition phase may be controlled adequately with respect to changes in signal current applied to the input terminals 3. It may be a Toulon circuit.

In case the ignition circuit 2 is formed by a magnetic amplifier, the phase shifter 5 may be omitted, and instead, the bias current of the magnetic amplifier is adjusted.

The main electrical source 6 supplies power to a load 7 through the SCR 1.

Figure 2:
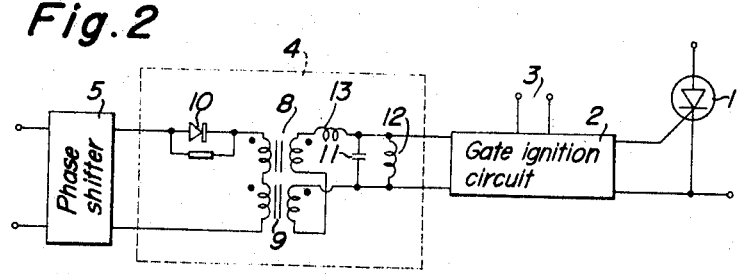
FIG. 2 is a circuit diagram of the frequency divider shown in FIG. 1.

The frequency divider 4 is shown in detail in FIG. 2, as an example. It is a ½ frequency divider with $m=n$ and $n=1$, and it comprises two non-linear iron cores 8 and 9 with primary and secondary windings associated therewith, respectively. A diode 10 is connected into the primary side to change the inductance of the cores with the same frequency as the A.C. source. In place of the diode, another non-linear element or a direct current source may be utilized. A capacitor 11 and coils 12 and 13 are connected in the secondary side, and the ½ frequency voltage is induced across the capacitor 11. The parallel coil 12 and series coil 13 are for raising the induced voltage, and or designed to resonate with the condensor 11 at a frequency ½ times the source frequency. With regard to the principle of oscillation, it is well-known as parameter oscillation.

With regard to the dividing factor of the frequency, several problems affect the determination of the factor, but in general, it is preferred to adopt $n/m=½$. With this value, the frequency divider can be simple in construction, with sufficiently wide range of control and good linearity.

Figure 3:
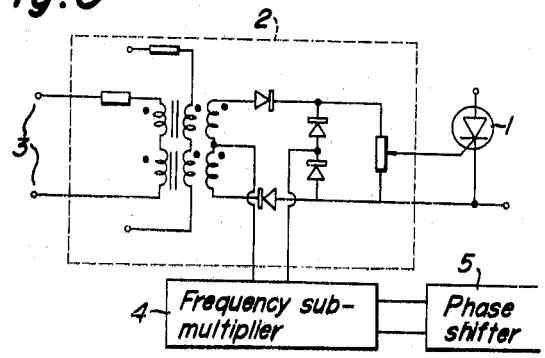
FIG. 3 is a circuit diagram of the gate ignition circuit shown in FIG. 1.

FIG. 3 illustrates a practical example of the ignition circuit 2 utilizing a magnetic amplifier of the self-saturation type. However, a magnetic amplifier of the external-feedback type, saturable reactor or the like may be utilized in the alternative.

Figure 4:
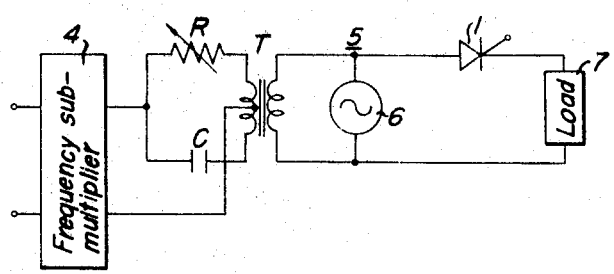
FIG. 4 is a circuit diagram of the phase shifter shown in FIG. 1.

An example of a circuit which may serve as the phase shifter 5 is shown in FIG. 4, and it is a Toulon circuit, known per se, comprising a transformer T, a variable resistor R, and a capacitor C. In such a circuit, by varying the value of resistor R or capacitor C, the phase can be changed over about 180° range, and the best phase angle can conveniently be obtained. Alternatively, a simple phase shifter consisting of C and R may be used for accomplishing the desired result according to the invention.

Figure 5:
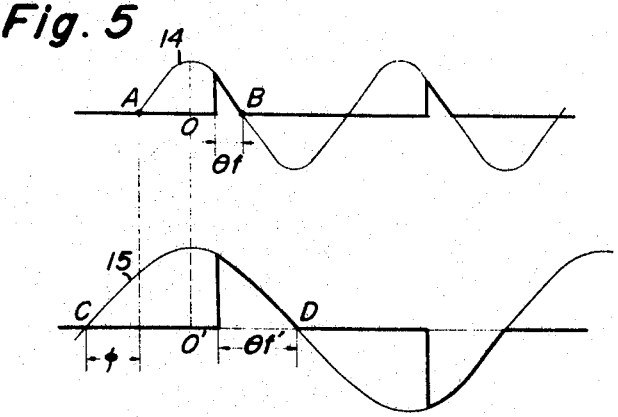
FIG. 5 is a graph showing wave forms appearing in the operation of the system shown in FIG. 1.

Referring to FIG. 5, the phase shifter 5 operates to shift the phase of the input voltage to frequency divider 4 by $\phi$, whereby the control range A–B of the main electrical source can adequately be covered. In this case, the value of $\phi$ is preferably adjusted so that the center O of the main-source voltage wave 14, coincides with the center O' of the output voltage wave 15. Such an adjustment is particularly desirable when magnetic means are employed in ignition circuits 2.

In operation, when the gate ignition circuit 2 is ignited at a phase angle $\theta f'$ of its input voltage 15, that is, the output voltage of frequency divider 4, in response to the control current applied to input terminals 3, and this voltage is applied to the gate circuit of SCR 1, the SCR is ignited at the phase angle $\theta f$ of the main source voltage 14.

In this case, the control range of gate ignition circuit 2 is such that good linear control can be obtained at least over 60 to 80% of the half-cycle period C–D of the input voltage 15. A half cycle period of input voltage 15 is correspondent to one cycle period of main source voltage 14, and consequently, even the control range of 60 to 80% of a half cycle of input voltage 15 can effect adequate control over a half cycle period A–B of main source voltage 14. As a result, by adjustment of the control current applied to the input terminals 3, the ignition phase angle $\theta f$ of SCR with respect to the main source voltage 14 can be controlled at well over the range from 0 to 180 degrees with good linearity.

In the above description, the input voltage 15 to the gate ignition circuit is assumed to have a frequency equal to a half of the frequency of the main source voltage 14, but it is to be understood that any other suitable submultiple of the frequency of voltage 15, may be used for the purpose of the present invention.

What I claim is:

1. An ignition controlling system for a voltage controlled rectifying device comprising:
    a voltage controlled rectifier having a control electrode,
    a main source of A.C. electrical power connected to said voltage controlled rectifier,
    ignition control means connected to said control electrode for controlling the phase angle of ignition of said rectifier in response to an applied control signal and an applied A.C. supply voltage from said main source,
    frequency divider means connected between said main source and said ignition control means for dividing the frequency of the A.C. supply voltage applied to said ignition control means to a submultiple of the frequency of said main source, and
    further including phase shifting means connected between said main source and said frequency divider means for adjusting the phase of the A.C. supply voltage applied to said ignition control means.

References Cited

UNITED STATES PATENTS

| | | | |
|---|---|---|---|
| 3,231,812 | 1/1966 | Paley. | |
| 2,810,105 | 10/1957 | Henrich | 323—4 X |
| 2,944,205 | 7/1960 | Keizer et al. | 321—69 |
| 3,091,729 | 5/1963 | Schmidt | 323—89 X |
| 3,128,422 | 4/1964 | Brown | 323—34 X |
| 3,128,440 | 4/1964 | Davis | 323—89 X |
| 3,242,413 | 3/1966 | Hardies | 323—22 |
| 3,244,965 | 4/1966 | Gutzwiller | 323—22 |

LEE T. HIX, Primary Examiner

A. D. PELLINEN, Assistant Examiner

U.S. Cl. X.R.

321—69; 323—34